(12) United States Patent
Lim et al.

(10) Patent No.: US 12,394,863 B2
(45) Date of Patent: Aug. 19, 2025

(54) COMPOSITE SEPARATOR FOR LITHIUM SECONDARY BATTERY AND MANUFACTURING THE SAME

(71) Applicant: G-Materials Co., Ltd., Gwangmyeong-si (KR)

(72) Inventors: Chang Sup Lim, Seoul (KR); Kyoung Ran Im, Seoul (KR); Soon Yong Jeong, Gwangmyeong-si (KR)

(73) Assignee: G-MATERIALS CO., LTD., Gwangmyeong-si (KR)

( * ) Notice: Subject to any disclaimer, the term of this patent is extended or adjusted under 35 U.S.C. 154(b) by 698 days.

(21) Appl. No.: 17/630,678

(22) PCT Filed: Aug. 24, 2020

(86) PCT No.: PCT/KR2020/011233
§ 371 (c)(1),
(2) Date: Jan. 27, 2022

(87) PCT Pub. No.: WO2021/034159
PCT Pub. Date: Feb. 25, 2021

(65) Prior Publication Data
US 2022/0320682 A1 Oct. 6, 2022

(30) Foreign Application Priority Data
Aug. 22, 2019 (KR) .................. 10-2019-0102872

(51) Int. Cl.
*H01M 50/446* (2021.01)
*H01M 10/42* (2006.01)
(Continued)

(52) U.S. Cl.
CPC ..... *H01M 50/446* (2021.01); *H01M 10/4235* (2013.01); *H01M 50/403* (2021.01);
(Continued)

(58) Field of Classification Search
CPC ......... H01M 10/0525; H01M 10/4235; H01M 50/403; H01M 50/414; H01M 50/417;
(Continued)

(56) References Cited

U.S. PATENT DOCUMENTS

2006/0046149 A1 3/2006 Yong et al.
2014/0107275 A1 4/2014 Uemura et al.
(Continued)

FOREIGN PATENT DOCUMENTS

| CN | 101180751 | 5/2008 |
|---|---|---|
| CN | 101512792 | 8/2009 |

(Continued)

OTHER PUBLICATIONS

KIPO, International Search Report & Written Opinion of Application No. PCT/KR2020/011233, dated Dec. 18, 2020.
(Continued)

*Primary Examiner* — Lingwen R Zeng
(74) *Attorney, Agent, or Firm* — LEX IP MEISTER, PLLC

(57) ABSTRACT

The present invention relates to a composite separator for a lithium secondary battery, and an aqueous manufacturing method therefor, the composite separator comprising: a porous polymer substrate; a heat-resistant coating layer containing inorganic material formed on the surface of the porous polymer substrate; and a composite binder in which an organic-inorganic composite sol and an organic polymer are mixed, or an modified organic polymer binder, which bonds the porous polymer substrate and the heat-resistant coating layer, and a nonionic surfactant. Composite separators disclosed in the present invention exhibits high air permeability, low thermal shrinkage, and excellent electro-chemical characteristics.

10 Claims, 4 Drawing Sheets

(51) Int. Cl.
  *H01M 50/403* (2021.01)
  *H01M 50/414* (2021.01)
  *H01M 50/431* (2021.01)
  *H01M 50/451* (2021.01)
  *H01M 10/0525* (2010.01)
  *H01M 50/423* (2021.01)
  *H01M 50/434* (2021.01)
  *H01M 50/46* (2021.01)

(52) U.S. Cl.
  CPC ....... *H01M 50/414* (2021.01); *H01M 50/431*
  (2021.01); *H01M 50/451* (2021.01); *H01M*
  *10/0525* (2013.01); *H01M 50/423* (2021.01);
  *H01M 50/434* (2021.01); *H01M 50/461*
  (2021.01); *Y02E 60/10* (2013.01)

(58) Field of Classification Search
  CPC ............. H01M 50/423; H01M 50/431; H01M
  50/434; H01M 50/446; H01M 50/451;
  H01M 50/461; Y02E 60/10
  See application file for complete search history.

(56) References Cited

U.S. PATENT DOCUMENTS

| | | | |
|---|---|---|---|
| 2014/0308565 A1 | 10/2014 | Lee et al. | |
| 2016/0104876 A1 | 4/2016 | Avison et al. | |
| 2016/0172678 A1* | 6/2016 | Oyama | H01G 11/52 |
| | | | 525/60 |

FOREIGN PATENT DOCUMENTS

| | | |
|---|---|---|
| CN | 103181000 | 6/2013 |
| CN | 103515564 | 1/2014 |
| CN | 107438912 | 12/2017 |
| CN | 108987649 | 12/2018 |
| JP | 2012-529742 | 11/2012 |
| JP | 2013-030497 | 2/2013 |
| JP | 2016-521433 | 7/2016 |
| KR | 10-2008-0019621 | 3/2008 |
| KR | 10-2010-0135369 | 12/2010 |
| KR | 10-2013-0134926 | 12/2013 |
| KR | 10-2014-0139685 | 12/2014 |
| KR | 10-2016-0109669 | 9/2016 |
| KR | 10-2016-0118966 | 10/2016 |
| KR | 10-2017-0016904 | 2/2017 |
| KR | 10-2017-0116817 | 10/2017 |
| KR | 10-1838654 | 4/2018 |
| KR | 10-2019-0048864 | 5/2019 |
| WO | 2008-029922 | 3/2008 |
| WO | 2012-099149 | 7/2012 |
| WO | 2017-169845 | 10/2017 |
| WO | 2018-235601 | 12/2018 |

OTHER PUBLICATIONS

EPO, Search Report of EP 20854740.6 dated May 29, 2024, total 9 pages.

* cited by examiner

COMPOSITE SEPARATOR FOR LITHIUM SECONDARY BATTERY AND MANUFACTURING THE SAME

TECHNICAL FIELD

The present invention relates to a composite separator for a lithium secondary battery exhibiting high air permeability and low thermal shrinkage, and a manufacturing method therefor.

BACKGROUND OF INVENTION

Recently, according to trends of high capacity and high output of a secondary battery, there is a growing demand for a separator with high strength, high air permeability, and low thermal shrinkage, which leads to electrical safety of a lithium secondary battery during charging/discharging.

In the case of a lithium secondary battery, high mechanical strength is required to improve safety during a battery manufacturing process and use of a battery, and high air permeability and high thermal stability are required to improve capacity and output. For example, a thermal stability problem in a separator of a lithium secondary battery is very important, if the thermal stability of the separator is low, damage or deformation of a separator caused by a temperature rise in a battery may cause a short circuit between electrodes, which may cause an explosion. In addition, since the application of the secondary battery is expanded to a hybrid vehicle or the like, the safety of a battery due to overcharging becomes very important. Therefore, a high heat-resistance of a separator is required to prevent the separator from shrinking due to the heat generated by overcharging. The role of a separator for preventing a short circuit between electrodes is important. Accordingly, characteristics such as low thermal shrinkage, high puncture strength of the separator are required, and additionally excellent air permeability and thin thickness are required for the development of high capacity and high power cells. The separator used in such a secondary battery is a polyolefin-based polymer film. The polyethylene separator has a severe shrinkage at a high temperature and weak mechanical strength, so when the temperature of the battery rises rapidly, the edge of the separator is contracted so that the positive electrode and the negative electrode come into contact with each other so as to generate a short circuit, thereby may be resulted in heat generation, ignition, or explosion.

Improving the safety of a battery can be achieved by simply increasing the thickness of a separator. However, mechanical strength is improved as the thickness of a separator increases, but the battery capacity and output are degraded and the battery is not suitable for the miniaturization. In order to compensate for these shortcomings, applying an inorganic oxide layer on a porous polyethylene substrate has been used for increasing the heat-resistance and the mechanical strength of a separator. Alumina is commonly used for an inorganic material. Attempts have been made to improve the poor adhesion between an inorganic layer and a porous polyethylene substrate. It was achieved by forming a coating layer on a substrate by using an alumina slurry with an aid of a small amount of an organic binder such as polyvinyl alcohol (PVA), and then depositing nano-sized alumina (<20 nm) over the layer by an atomic layer deposition method (Korean Patent Laid-Open Publication No. 10-2016-0109669). Another method is laminating an adhesive layer such as poly(methy methacrylate) (PMMA) over an inorganic layer, which is disclosed (Korean Patent Laid-Open Publication No. 10-2016-134046). On the other hand, a lot of research is being conducted on the development of a highly heat-resistant organic binder to connect inorganic particles to each other and adhere them to the PE substrate. A method is disclosed in Korean Patent Laid-Open No. 10-2017-0016904; mixing alumina powder with a high heat-resistant polymer such as PVDF dissolved in an organic solvent such as acetone, and then coating the slurry on PE substrate. For a water-based system, a coating slurry is prepared using a water soluble binder such as PVA, acrylic, cellulose, or latex binders in water, and then is coated on a porous PE substrate as described in Korean Patent Laid-Open No. 10-2017-0116817. A method of improving physical properties by adding PE wax, PVDF emulsion, and polymer beads (Korean Patent No. 10-1838654) are also known.

In recent years, in order to reduce the thickness of a separator and increase the porosity, researches on using a plate-shaped boehmite instead of alumina have been reported. Boehmite has also merits such as lower specific gravity and hardness than alumina, thereby having a small risk of damage.

Therefore, there is a demand for a separator with high air permeability and low thermal shrinkage by using boehmite instead of alumina.

DISCLOSURE OF INVENTION

Technical Problem

The purpose of the present invention is to solve the problems of the prior art, and to provide a composite separator for a lithium secondary battery exhibiting high air permeability and low thermal shrinkage. In addition, another object of the present invention is to provide a method for manufacturing a composite separator for a lithium secondary battery.

Technical Solution

To achieve the above object, the composite separator for a lithium secondary battery of the present invention comprises: a porous polymer substrate; a heat-resistant coating layer containing an inorganic material formed on the surface of the porous polymer substrate; and a binder for adhering the porous polymer substrate and the heat-resistant coating layer (an organic-inorganic composite sol binder and/or an organic polymer binder), and a surfactant for improving wettability and adhesion.

The binder can be used in an amount of 1 to 10 parts by weight with respect to 100 parts by weight of an inorganic material. An organic polymer binder which includes an organic polymer or a modified organic polymer and an organic-inorganic composite sol constituting the composite binder can be mixed in a weight ratio of 1:0 to 2.

The organic-inorganic composite sol comprises steps of: (a) dispersing boehmite powder in distilled water with stirring, adding an acid, and then heating to produce a translucent alumina sol; (b) mixing the alumina sol of (a) and an epoxy silane, heating the mixture, and then adding an alkyl silane while heating; and (c) cooling the mixture of (b), adding a yttrium compound with stirring at room temperature to produce an organic-inorganic composite sol.

The organic polymer binder may be one or more selected from the group consisting of polyvinyl alcohol (PVA), modified polyvinyl alcohol with maleic acid (PVA/MA (PM), further modified. PM with a small amount of nano sized silica or alumina (PMs or Ma), or polyethylene glycol (PEG).

The surfactant is nonionic and comprises 0.1 to 5 parts by weight of an inorganic material. The porous polymer substrate can be one kind selected from the group consisting of polyethylene, polypropylene, polyethylene terephthalate, polybutylene terephthalate, polyester, polyacetal, polyamide, polycarbonate, polyimide, polyether ether ketone, polyether sulfone, polyphenylene oxide, polyphenylene sulfide, and polyethylene naphthalate.

The inorganic material forming the heat-resistant coating layer may be at least one selected from the group consisting of boehmite, barium titanate, alumina, silica, zirconia, and titanium oxide. The average particle size of the inorganic material can be 4 to 500 nm, and preferably, the particles having an average particle size of 30 to 500 nm and small particles having 4 to 20 nm are mixed in a weight ratio of 1:0.05 to 0.3. The thickness of the heat-resistant coating layer may be 0.5 to 10 μm.

In addition, the method for manufacturing a composite separator for a lithium secondary battery according to the present invention comprises the steps of: (A) dispersing inorganic powder in distilled water; (B) adding a binder to the dispersion of (A) to prepare a mixture; (C) adding a surfactant to the mixture of (B) to prepare a coating slurry; and (D) coating the porous polymer substrate with the coating slurry of (C), drying at room temperature, and then drying high temperature to form a composite separator. The concentration of the inorganic material in the step (A) can be 5 to 45 wt %.

Effect of the Present Invention

The composite separator for a lithium secondary battery of the present invention exhibits high air permeability and low thermal shrinkage. It was achieved by using a composite binder which is a mixture of an organic-inorganic composite sol and an organic polymer, and/or an modified organic polymer, and then addition of a nonionic surfactant. Moreover, due to the reduced amount of the organic polymer used as a binder, the increase in electrical resistance is reduced. Fine pores generated when drying the organic-inorganic composite sol increase air permeability and surface area, thereby helping to impregnate the electrolyte.

In addition, it was shown that if a powder having a large particle size and that of a small size are mixed at a proper ratio, excellent properties can be obtained even at a low slurry concentration. And it was also shown that the use of a small amount of nonionic surfactant helps to improve wettability, adhesion, and heat-resistance of the separator.

BEST MODE FOR THE PRACTICE OF THE INVENTION

Figure 1:
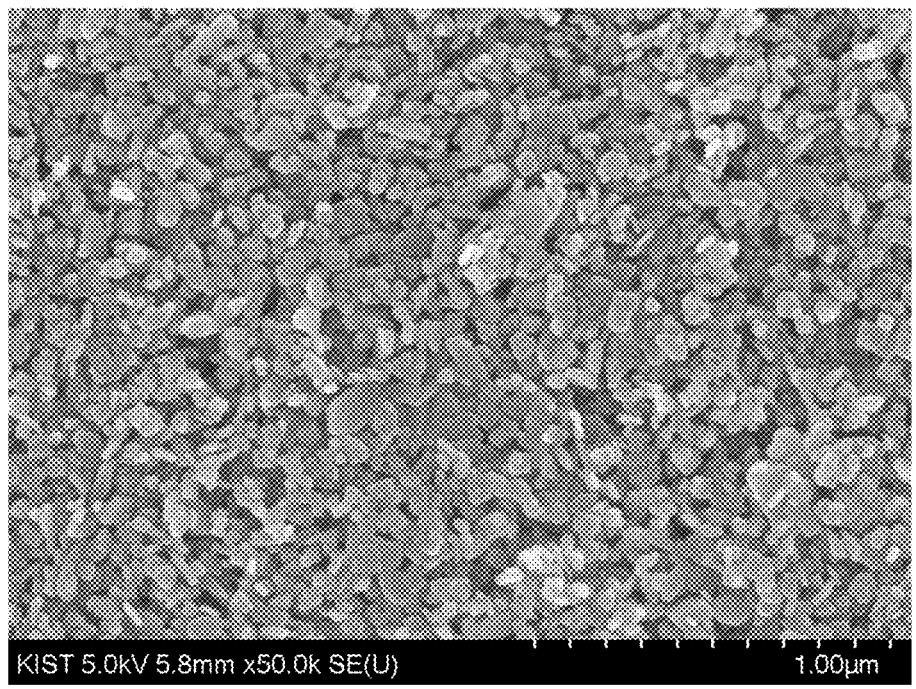
FIG. 1 is a SEM photograph of a surface of the composite separator manufactured according to Example 2 of the present invention.

The present invention relates to a composite separator for a lithium secondary battery exhibiting high air permeability and low thermal shrinkage, and a manufacturing method therefor.

A conventional composite separator is provided to form an inorganic material as a coating layer by using only an organic polymer as a binder, thus prepared separator with an organic polymer or an emulsion show an increased electric resistance and a poor air permeability.

The present invention solves the above problems by reducing the content of an organic polymer by using a composite binder which is a mixture of an organic-inorganic composite sol and an organic polymer. In addition, in the present invention, the water-soluble organic polymer binder was modified to become insoluble in water after dried. A PM solution was prepared by reacting PVA with maleic acid to give an adhesive polymer almost insoluble in water after dried. Attempts were made to enhance the adhesion and moisture resistance of the PM by modifying with nano-sized silica or boehmite. They were insoluble in water after dried and named as PMs or PMa, respectively. These modified organic polymer binders also solve the above problems by reducing the content of the organic polymer.

In the present invention, the heat resistance and the adhesion of the binder are improved by introducing an appropriate surfactant.

Mode for the Practice of the Invention

Hereinafter, the present invention will be described in detail.

The composite separator for a lithium secondary battery of the present invention comprises of: (a) a porous polymer substrate; (b) a heat-resistant coating layer of inorganic material formed on the surface of the porous polymer substrate a composite binder in which an organic-inorganic composite sol and an organic polymer are mixed, or a modified organic polymer binder, and (d) a nonionic surfactant.

Binder

The binder refers to a composite binder in which an organic-inorganic composite sol and an organic polymer are mixed, or an modified organic polymer binder. The composite binder and the modified organic binder do not dissolve in water after dried. It provides a composite separator with the heat-resistant coating layer formed on the porous polymer substrate with excellent adhesion, thereby, providing a composite separator with high air permeability and high heat-resistance. It is used in an amount of 1 to 10 parts by weight, preferably 2 to 6 parts by weight, based on 100 parts by weight of the inorganic material.

When the content of the composite: binder is less than the lower limit of the preferred range, the adhesive force becomes not strong enough and the thermal shrinkage cannot be satisfied at high temperatures. If it exceeds the upper limit, the air permeability is deteriorated by filling pores, and the thermal shrinkage is not much influenced, but the electric resistance is substantially increased, which is undesirable.

The binder of the present invention shows an improved heat-resistance of a composite separator when used with a nonionic surfactant. The organic polymer binder used in the present invention improves flexibility and adhesion, and is selected from the group of consisting of polyvinyl alcohol (PVA), polyvinyl alcohol/maleic acid (PVA/MA; PM), modified PM such as PMa, PMs, and polyethylene glycol (PEG). Water soluble PVA is not desirable as a binder for a composite separator, but the modified PVA by the reaction with maleic acid shows greatly improved moisture resistance compared to PVA when dried. The weight ratio of PVA to MA is preferably 1:0.1 to 0.4. If out of the range, the moisture resistance is weak or opaque, and the non-uniform film may be formed. In order to increase the moisture resistance of the PM binder, a hybrid sol is manufactured by introducing nano-sized silica or boehmite, and referred to as PMs or PMa, respectively. The PMs or PMa binder has an advantage of forming a film which does not dissolve in water after dried, thereby providing a composite separator with high humidity resistance. The amount of the nano sized inorganic material used in the production of PMs and PMa is 0.01-0.2 parts by weight based on the PM. When the amount is lower than the lower limit, the moisture resistance decreases, and when it is higher than the upper limit, the unreacted nanoparticles precipitate out and a uniform film cannot be formed. In addition to maleic acid, one or more can be selected from the group consisting of citric acid, oxalic acid, malic acid, and succinic acid.

The organic polymer binder and the composite sol binder are mixed in a weight ratio of 1:0 to 5, preferably 1:0 to 3. When the content of the composite sol does not satisfy the above preferred range, both air permeability and heat-resistance may be deteriorated. The composite binder improves the adhesion of the porous polymer substrate and the coating layer of inorganic material. The composite separator prepared with the composite binder exhibits moisture-insensitive, high air permeability, and high heat-resistance.

The organic-inorganic composite sol is prepared via the steps of: (a) preparing an alumina sol by dispersing boehmite powder in distilled water, and adding an acid and heating to be translucent; (b) mixing and heating the alumina sol of (a) with an epoxy silane, and then adding an alkyl silane while heating; and (c) cooling the mixture of (b), adding an yttrium compound and stirring at room temperature.

In the step (a), the boehmite powder is dispersed in distilled water, and then an acid is added to form an alumina sol by stirring at room temperature (23-27° C.) for 3-10 hours, or the reaction time can be reduced by heating to 50-80° C. The acid is added in 5 to 20 parts by weight with respect to 100 parts by weight of boehmite powder to peptize the boehmite slurry. The acid is not particularly limited as long as it can peptize the boehmite slurry. It can be one or more selected from the group consisting of nitric acid, acetic acid, hydrochloric acid, phosphoric acid, formic acid, and organic acid. When peptizing a boehmite slurry with an acid, a desired alumina sol cannot be formed when the temperature and time are less than the lower limit, and when it exceeds the upper limit, an alumina sol may be obtained with precipitates. The properly prepared alumina sol is stable and thixotropic. In the step (b), the formed alumina sol and an epoxy silane are mixed in an acid media and heated at 50 to 80° C. for 2 to 5 hours, and then an alkyl silane is added and further heated for 3 to 4 hours. In the step (c), after cooling the sol of (c), a small amount of an yttrium compound is added and stirred at room temperature for a few hours. Through the above steps, an organic-inorganic composite sol is prepared.

The alumina sol is mixed with 10 to 40 parts by weight of boehmite with respect to 100 parts by weight of epoxy silane and then heated to proceed a reaction. If it is out of the above range, the adhesion is weak, or a transparent film cannot be formed upon drying. The epoxy silane may be selected from the group of consisting of 3-glycidoxy-propyltrimethoxysilane (GPTMS, GPS), 3-glycidoxypropyltriethoxysilane (GPTES), and mercaptopropyltrimethoxysilane (McPTMS).

In addition, the acid is added in an amount of 0.5 to 3 parts by weight with respect to 100 parts by weight of the epoxy silane. Type and amount of acid used influence on the properties of an organic-inorganic composite sol, such as viscosity, adhesion, and thixotropy. These properties are also affected when the reaction temperature and time are out of the above range.

The alkyl silane is used to improve the viscosity and adhesion of the organic-inorganic composite sol, and is mixed with 3 to 8 parts by weight with respect to 100 parts by weight of the alumina-epoxy silane mixture. When the content of the alkyl silane is out of the range, the organic-inorganic composite sol may not be obtained with improved adhesion. The alkyl silane is selected from the group consisting of methyltrimethoxysilane, methyltriethoxysilane, ethyltrimethoxysilane, ethyltriethoxysilane, vinyltrimethoxy-silane, vinyltriethoxysilane, 3-acryloxypropyltrimethoxysilane, 3-acryloxypropyl-triethoxysilane, 3-(methacryloxypropyl)trimethoxysilane, and 3-(methacryloxypropyl)-triethoxysilane. When the reaction conditions are out of the above range, the viscosity, pH, adhesion, and thixotropic properties of the organic-inorganic composite sol may be deteriorated.

In the step (c), the heated mixture is cooled with stirring to room temperature, and then modified by adding an yttrium compound to further improve the adhesion, and resulted in a stable organic-inorganic composite sol.

Heat Resistant Coating Layer

The heat-resistant coating layer of the present invention is a layer made of an inorganic material, which is chemically and electrically stable in a lithium secondary battery. The average particle size of the inorganic material ranges from 4 to 500 nm, preferably 4 to 100 nm, and more preferably mixing large particles and small particles. Here, an average particle size of 30 to 500 nm and that of 4 to 20 nm are mixed in a weight ratio of 1:0.05 to 0.3. When the mixing ratio of large particles and small particles is out of the above range, the air permeability may be lowered, but the thermal shrinkage is influenced little. In addition, when the average particle size of the inorganic material is less than the lower limit of the preferred range, the thermal shrinkage hardly occurs but the air permeability is significantly reduced due to its dense packing, and when it exceeds the upper limit, the air permeability is increased due to its loose packing, and the adhesion of the particles on the substrate is weakened to give rise to an increased thermal shrinkage.

The inorganic material used in the present invention includes at least one selected from the group consisting of boehmite, alumina, silica, barium titanate, zirconia, and titanium oxide. Boehmite is preferred because of its plate shape, that of several tens of nm can provide a low stacking height with a large number of small pores generated by stacking plate-shaped particles.

The thickness of the heat-resistant coating layer is 0.3 to 10 μm, preferably 0.5 to 5 μm. When the thickness of the heat-resistant coating layer is less than the lower limit of the preferred range, a desired effect cannot be obtained. If it exceeds the upper limit, the ion conductivity is lowered and resulted in a low capacity.

A method for forming a heat-resistant coating layer may be one from the conventional methods such as dip coating, bar coating, gravure coating, and slit coating.

Porous Polymer Substrate

The porous polymer substrate used in the present invention is a porous stretched film with a porosity of 30-60%, and can include one selected from the group consisting of polyethylene, polypropylene, polyethylene terephthalate, polybutylene terephthalate, polyester, polyacetal, polycarbonate, polyimide, polyether ether ketone, polyether sulfone, polyphenylene oxide, polyphenylene sulfide, and polyethylene naphthalate.

In addition, the present invention can provide a method for manufacturing a composite separator for a lithium secondary battery. It is comprised of the steps of: (a) dispersing inorganic powder in distilled water; (b) adding a binder to the dispersion of (a) to prepare a mixture; (c) adding a surfactant to the mixture of (b) to prepare a coating slurry; and (d) coating the porous polymer substrate with the coating slurry of (c), drying at room temperature, and further drying at a high temperature of 90 to 110° C. to give a composite separator.

The concentration of the inorganic material dispersed in the distilled water in the step (a) is 5 to 45 wt %, preferably 10 to 35 wt %, and when the concentration of the inorganic material is less than the lower limit of the preferred range, the thermal shrinkage is too high, and if it exceeds the upper limit, the layer may not be coated uniformly due to its high viscosity, thereby deteriorating performance. In the step (c), as an additive a nonionic surfactant is used in an amount of 0.1 to 5 parts by weight, preferably 0.1 to 2.5 parts by weight, based on 100 parts by weight of the inorganic material to improve the heat-resistance of a composite separator. When the content of a nonionic surfactant is less than the lower limit of the preferred range, heat resistance may not be improved, and when it exceeds the upper limit, it may cause a decrease in air permeability. The nonionic surfactant is a fluorine-based nonionic surfactant selected from the group consisting of diethylene glycol perfluorohexyl ether, diethylene glycol perfluoropentyl ether, diethylene glycol perfluorobutyl ether, diethylene glycol perfluoropropyl ether, diethylene glycol perfluoroethyl ether, triethylene glycol perfluorohexyl ether, triethylene glycol perfluoropentyl ether, triethylene glycol perfluorobutyl ether, and triethyleneglycol perfluoropropyl ether; or a polysiloxane-based nonionic surfactant selected from the group consisting of dimethylsiloxane, methylcetyloxysiloxane, octyltrimethylsiloxane, and dodecamethylcyclosiloxane.

Although a preferred embodiment of the present invention is presented in order to help the understanding of the present invention, it will be apparent to those skilled in the art that various changes and modifications are possible within the scope of the present invention and scope of technical idea, but the following examples are only illustrative of the present invention. It is natural that such modifications and variations fall within the scope of the appended claims.

Preparation Example 1

Reparation of Organic-Inorganic Composite Sol

An alumina sol was prepared by adding 30 g of boehmite powder to 260 ml of distilled water, with stirring, followed by addition of 3.3 g acetic acid, stirred at room temperature for 1 hour, and then heated to about 70° C. and maintained at that temperature for 2 hours, and cooled to room temperature, and distilled water was added to make 300 g of total weight to make an alumina sol of 10 wt %. To 130 g of 3-glycidoxypropyltrimethoxysilane (GPS), 39 g of 5 wt % acetic acid solution was added, stirred at room temperature for 1 hour, and then 377.2 g of the above alumina sol was added to the mixture at about 70° C. and heated for 4 hours. When the reaction was completed, 2.71 g of a 5 wt % acetic acid solution was added, followed by adding 21.79 g of methyltriethoxysilane by dropwise while heating and continued for 4 hours. After cooling the heated mixture to room temperature, 2.74 g of $Y(NO_3)_3 \cdot 6H_2O$ was added and stirred to prepare an organic-inorganic composite sol.

Preparation Example 2

Preparation of Modified Organic Polymer Binder

A transparent solution is prepared by dispersing polyvinyl alcohol (PVA) (Saponification>88%, an average molecular weight<200,000) powder in distilled water to 5-10 wt % of concentration, and followed by heating at about 90° C. Maleic acid (MA) is added to the PVA solution at a weight ratio of 8:2 for PVA:MA, and heated to give a clear solution and named as PM. To this PM solution, tetraethoxysilane (TEOS) diluted in ethanol is added at an amount of 5 to 10 wt % as silica with respect to the amount of the PVA to give a stable modified PM solution with silica, and named as PMs. A stable PMa solution was also prepared by using 10 wt % of boehmite powder with average particle size of 4.5 nm instead of TEOS as described in the procedure for PMs.

Example 1

A coating slurry for a composite separator is prepared by adding the organic-inorganic composite sol prepared in Preparation Example 1 to the boehmite slurry prepared by dispersing the boehmite (Disperal 10F4, Sasol, average particle size of 40 nm) powder in the distilled water and stirring the same at room temperature for 60 minutes, adding PVA and stirring with the composition shown in Table 1. After immersing the porous PE substrate of thickness of 9 μm in the coating slurry, and was pulled up through two glass rods, dried at room temperature for 30 minutes or more, and then dried in an oven at 90° C. for 30 minutes to give a composite separator with a heat-resistant coating layer formed on the surface of the polymer substrate.

Examples 2 to 5

Use of Surfactant

In the same procedure as in Example 1, coating slurries for composite separators were manufactured at the compositions shown in Table 1 with a fluorine-based nonionic surfactant, and then composite separators were manufactured. The surface of the composite separator of Example 2 was photographed by SEM (FIG. 1).

Example 6

Use of Boehmite Dispersion

In the same procedure as in Example 2, a composite separator was manufactured at the composition in Table 1 with a boehmite dispersion (20 wt % alumina dispersion, an average, particle size of 20 nm, Condea) instead of boehmite powder. Its surface was observed by SEM and shown in FIG. 2.

Examples 7 and 8

Mixing Boehmite Powder and Boehmite Dispersion

In the same procedure as in Example 2, composite separators were prepared with the composition shown in Table 1 by mixing boehmite powder having an average particle size of 40 nm and a boehmite dispersion having an average particle size of 20 nm.

Example 9

Mixing Different Particle Sizes of Boehmite Powder

In the same procedure as in Example 2, the composite separator was manufactured with the composition shown in Table 1 by mixing the boehmite powder having an average particle size of 40 nm and the boehmite powder having an average particle size of 4.5 nm.

Examples 10 and 11

Influence of Reaction Temperature

A composite separator was prepared using the slurry prepared in the same procedure as in Example 2 with the composition shown in Table 2. In order to see the effect of heating, the coating slurry of Example 10 was heated at about 70° C. for 17 hours, and used in Example 11.

Examples 12 to 15

Use of Modified Organic Polymer Binders (PM, PMs, PMa) Instead of PVA

Figure 4:
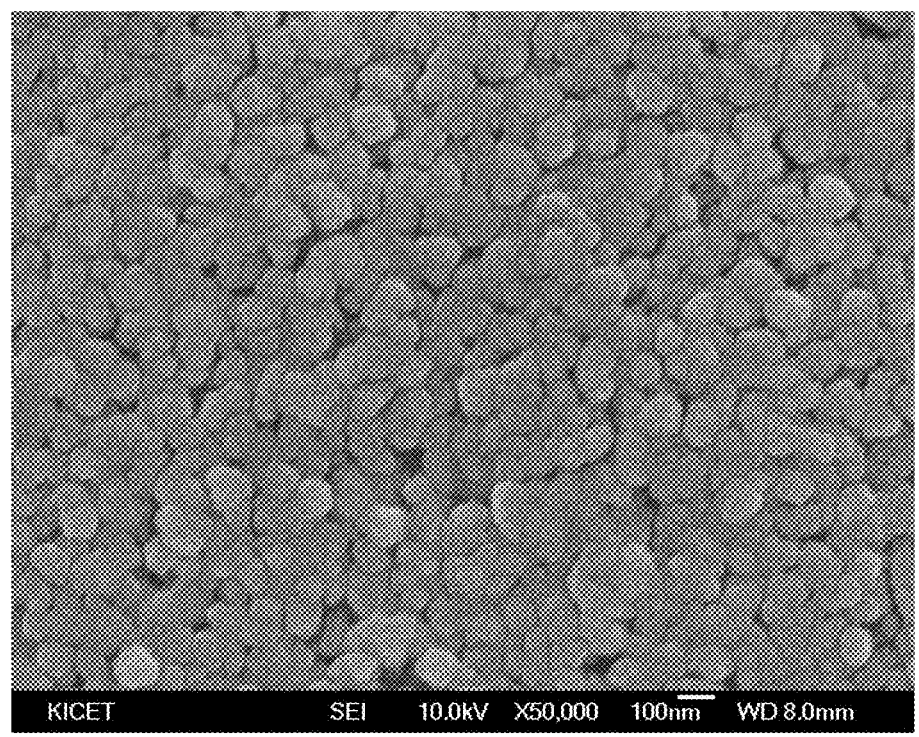
FIG. 4 is a SEM photograph of a surface of the composite separator manufactured according to Example 15 of the present invention.

Composite separators were prepared in the same procedure as in Example 2 with the compositions shown in Table 2, except that the modified organic binders from Preparation Example 2 were used instead of PVA. Example 12 did not contain a surfactant for comparison. The surface of the composite separator prepared according to Example 15 was photographed by SEM (FIG. 4).

Examples 16 to 18

Only Modified Organic Polymer Binder as Binder

Figure 5:
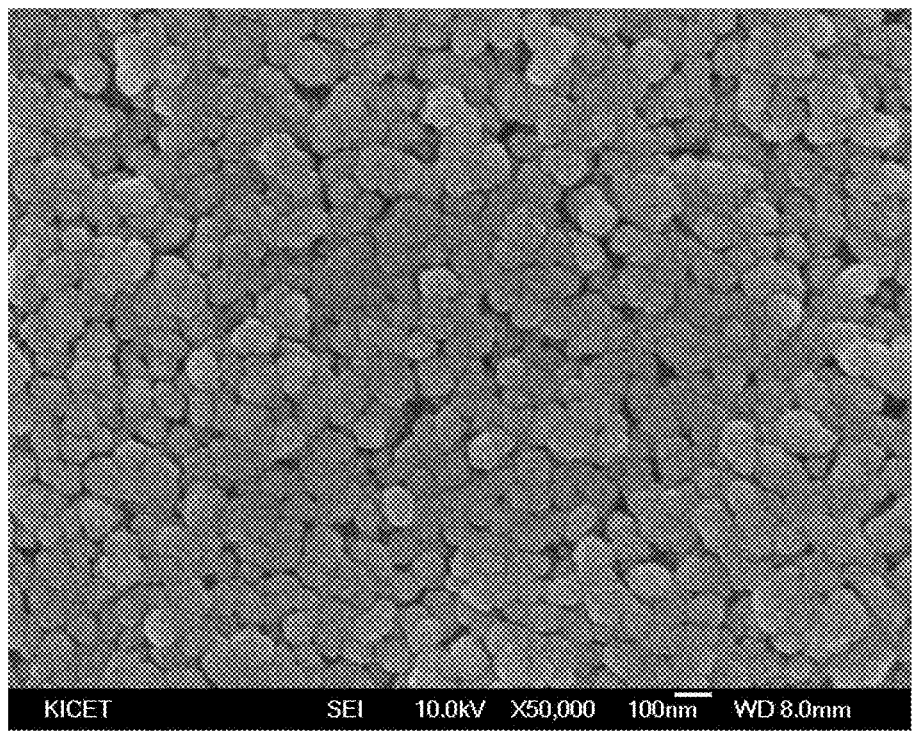
FIG. 5 is a SEM photograph of a surface of the composite separator manufactured according to Example 16 of the present invention.

In Examples 16 through 18, the organic-inorganic composite sol was not used, and only the modified organic polymer binder of PMs from Preparation Example 2 was used for manufacturing composite separators. They were prepared in the same procedure as in Example 10 with the compositions shown in Table 2. The surface of the composite separator prepared according to Example 16 was photographed by SEM (FIG. 5).

Comparative Example 1

Only Organic-Inorganic Composite Sol Binder as Binder

In the same manner as in Example 2, a composite separator was prepared at the composition shown in Table 1 using only the organic-inorganic composite sol.

Comparative Example 2

Use of Organic Polymer Binder, PVA as Binder

In the same manner as in Example 2, a composite separator was prepared at the composition shown in Table 1 using only PVA.

TESTS OF SEPARATORS

Polyethylene(PE) used as a substrate is a porous polymer film with a thickness of 9 μm, an excellent air permeability of 150 seconds/100 ml, but a high thermal shrinkage (%) of 10.8/22.0 (TD/MD) at 130° C. PE shrinks severely at high temperature, so it needs to be reinforced with a heat-resistant coating layer of inorganic oxide. In the present invention, the thickness of the heat-resistant coating layer manufactured according to Examples 1 to 9 is 2 to 6 μm, but the thickness of the heat-resistant coating layer manufactured according to Examples 10 to 18 is 0.4 to 3 μm.

Test Example 1

Measurement of Air Permeability and Thermal Shrinkage 1-1. The air permeability of the composite membrane prepared according to the examples and the comparative examples were measured according to the standard of JIS P8117, in which the time taken to pass 100 ml of air through the area of (1 inch)$^2$ of the separator is recorded and compared in seconds.

1-2. A method of measuring a thermal shrinkage of a composite separator comprises the steps of: preparing a sample by cutting a composite separator into a square shape having one side of 5 cm; placing the cut sample in the center of a A4 paper and repeating the same procedure with 3 or 4 cut separators by placing one over another, and then stacking 5 sheets of A4 papers on the top of the stacked samples as well as on the bottom of the sample; and fixing the four sides of the paper with clips. The sample wrapped with paper was placed in a hot air drying oven at 130° C. for 30 minutes. The samples were removed, measured, and obtained an average value, and then the thermal shrinkage (%) of the composite separator was calculated by TD/MD (transverse/machine direction).

Test Example 2

Evaluation of Electrochemical Properties

For the electrochemical experiment of the separator, a positive electrode plate was prepared using M1C622[Li(Ni$_{0.6}$Co$_{0.2}$Mn$_{0.2}$)O$_2$, average particle size=13 μm) as a positive electrode active material. In the method for manufacturing a positive electrode plate, a slurry is prepared by mixing an active material (M1C622), conductive carbon (Denka Black), polyvinylidene fluoride (PVDF)=80:10:10 by weight, and zirconia balls (3 balls of 10 mm, 6 balls of 5 mm) are added and mixed for 1.5 hours by a planetary mill. Thereafter, a positive electrode slurry was casted to a thickness of 23 μm using a doctor blade on a current collector Al_foil. It is dried in a ventilation oven at 80° C. for 8 hours and then dried in a vacuum oven at 80° C. for 24 hours.

In the electrochemical cell test, a 2032 type coin cells were assembled using a commercially available separator (Celgard 2400, polypropylene, 25 μm) and composite separators of the present invention. Here an organic electrolyte was used in a 1M $LiPF_6$ in a mixture of EC and DMC at a volume ratio of 1:1. The cell test conditions were 1/20C (1 cycle)→1/10C (2 cycles)→1/5C (5 cycles)→1/2C (5 cycles) →1C (5 cycles)→2C (5 cycles)→1/2C (30 cycles), and the cut off voltage was performed at 3.0 to 4.5 V.

As shown in Table 1, the composite separator prepared according to Example 2 of the present invention had a slightly slower air permeability than the composite separator of Example 1 at the same boehmite concentration in the slurry, but a greatly improved shrinkage was obtained for the separator in Example 2, which contains a surfactant. It proves that a surfactant works for positive effect.

From the above results, effects from mixing powders of different sizes was expected to work positively. And then it was confirmed in Examples 7 to 9 that when the boehmite powder is used by mixing large particles and small particles, excellent properties can be obtained even at a low concentration of boehmite. In Example 9, adding a small amount of fine powder of an average particle size of 4.5 nm showed excellent thermal shrinkage of 0.54/0.00% and good air permeability of 220.6 seconds even at a boehmite concentration in a slurry of 19.8% by weight (17.3% by weight of large particles and 2.5% by weight of small particles).

In contrast, the composite separators of Comparative Example 1 using only an organic-inorganic composite sol as a binder and Comparative Example 2 using only an organic polymer (PVA) binder have similar air permeabilities to Example 3, but Comparative Example 1 shows high thermal shrinkage, so the composite sol cannot be used alone as a binder. But Comparative Example 2 shows a good heat-resistance, i.e. low thermal shrinkage. But the PVA is reported to increase the electrical resistance by about 30% when 3% is used and has poor wetting on the electrolyte. Therefor it is not desirable to use PVA alone as a binder.

TABLE 1

| | COMPOSITION(wt %) | | | | | |
|---|---|---|---|---|---|---|
| | BOEHMITE CONCENTRATION IN SLURRY (wt %) | BOEHMITE | ORGANIC-INORGANIC COMPOSITE SOL | ORGANIC POLYMER (PVA) | SURFACTANT | AIR PERMEABILITY (SEC/100 ML) | SHRINKAGE (%, TD/MD) 130° C./ 30 min |
| EXAMPLE 1 | 17.9 | 100 | 5.03 | 1.96 | — | 170.7 | 3.66/5.42 |
| EXAMPLE 2 | 17.9 | 100 | 5.03 | 1.96 | 0.30 | 185.9 | 1.44/0.78 |
| EXAMPLE 3 | 20.9 | 100 | 2.30 | 2.00 | 0.52 | 177.8 | 1.68/0.88 |
| EXAMPLE 4 | 20.4 | 100 | 1.86 | 1.54 | 1.95 | 189.9 | 0.72/0.60 |
| EXAMPLE 5 | 30.4 | 100 | 2.30 | 2.50 | 0.36 | 177.9 | 0.42/0.00 |
| EXAMPLE 6 | 12.6* | 100 | 2.61 | 2.30 | 0.90 | 563.0 | 0.58/0.00 |
| EXAMPLE 7 | 26.2# + 4.4* | 100 | 4.85 | 0.80 | 0.29 | 253.0 | 0.52/0.1 |
| EXAMPLE 8 | 16.0# + 2.5* | 100 | 4.02 | 1.79 | 0.33 | 216.6 | 1.04/0.40 |
| EXAMPLE 9 | 17.3# + 2.5$ | 100 | 3.94 | 1.87 | 0.30 | 220.6 | 0.54/0.00 |
| | POLYETHYLENE FILM (9 μm) | | | | | 150 | 10.8/22.0 |
| COMPARATIVE EXAMPLE 1 | 21.9 | 100 | 1.50 | — | 0.31 | 167.0 | 8.36/16.10 |
| COMPARATIVE EXAMPLE 2 | 20.9 | 100 | — | 2.44 | 0.33 | 176.8 | 1.10/1.12 |

Average particle size of 40 nm,
*average particle size of 20 nm,
$average particle size of 4.5 nm In the composite separator prepared according to Examples 1 to 9 of the present invention, the air permeability of Example 3 using a coating solution of 20.9 wt % is high (fast), and the heat-shrinkage is 1.68/0.88. However, the air permeability of Example 5 in which the boehmite concentration in the slurry is increased to 30.4% by weight was found to be 177.9 seconds, and the thermal shrinkage was improved to 0.4/0.00%. In addition, according to Examples 4 and 5, when the boehmite concentration was increased from 20 wt % (Example 4) to 30 wt % (Example 5), the viscosity of the slurry was increased, but heat-resistance and air permeability are improved. This can be explained that the pores generated by the stacking of plate shaped particles of similar size are hardly affected by the concentration of the slurry.

Figure 2:
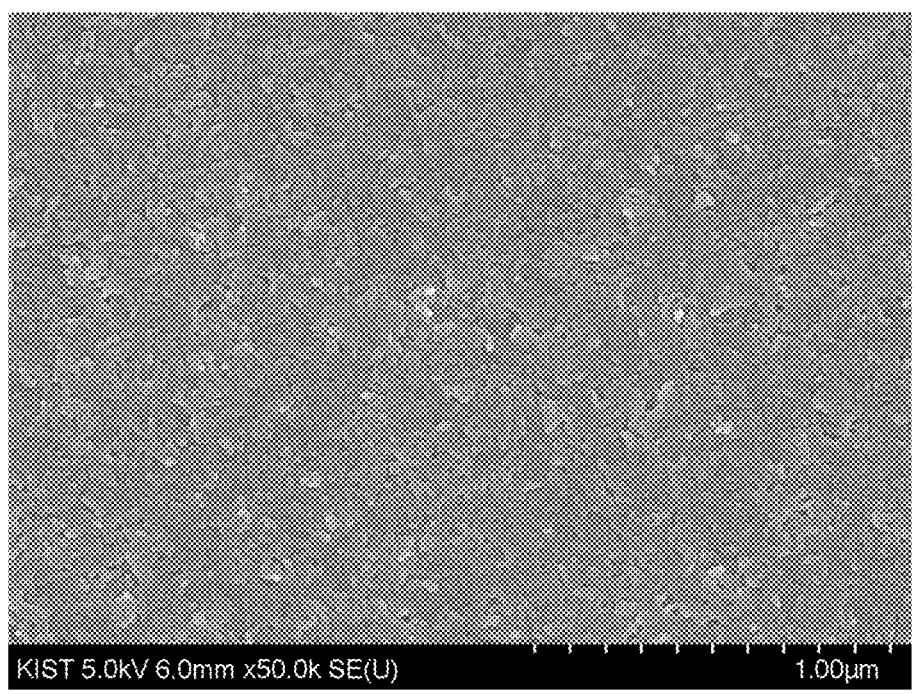
FIG. 2 is a SEM photograph of a surface of the composite separator manufactured according to Example 6 of the present invention.

Example 6, using a dispersion of boehmite (average particle size of 20 nm) confirmed that the thermal shrinkage was excellent at 0.583/0.00 even at a low slurry concentration of 12.6 wt %, but has the air permeability was significantly deteriorated to 563 seconds. As shown in FIG. 2, the fine powder is shown to be stacked without pores.

Figure 3:
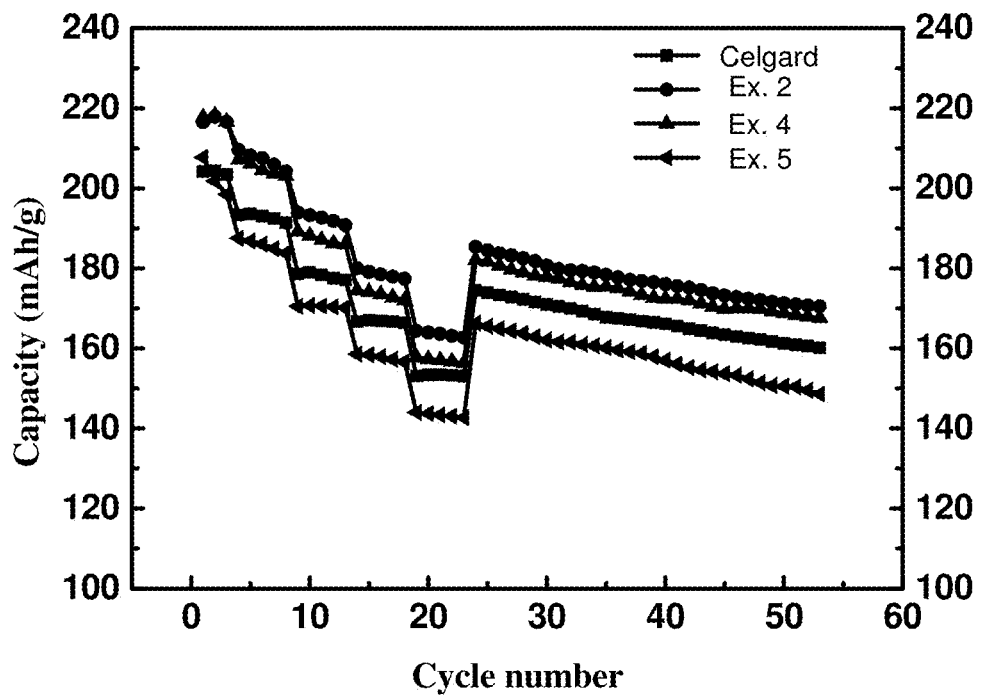
FIG. 3 is a graph comparing the discharge capacities vs cycle numbers for coin cells with separators from Examples 2, 4, and 5 of the present invention and the Celgard 2400.

In FIG. 3 showing the discharge capacities vs cycle numbers using the composite separators from the present invention, Example 2 and Example 4 showed superior characteristics than the separator of Celgard 2400, but Example 5, in which the concentration of boehmite in the slurry was 30 wt %, showed a low discharge capacity.

Since PVA is soluble in water and not moisture-resistant, it was modified to give moisture-resistant film when dried. Such modified organic polymer binders are named PM, PMa, and PMs. Composite separators were prepared with a type of boehmite powder (10F4, average particle size 40 nm) and a modified organic binder, PM, PMa, or PMs. The results are shown in Examples of 12 to 18, and compared with Example 10 with PVA in Table 2. From Table 2, the addition of the surfactant slightly lowers the air permeability, but the heat resistance is greatly improved. So, the addition of the surfactant is essential and preferably 0.1 to 5 wt % of the boehmite. If it is out of the range, the air permeability and the thermal shrinkage may be adversely affected.

Dried films of PMs and PMa do not dissolve at all when immersed in water for 48 hours, but that of PM is slightly damaged, which means that PMs or PMa may work better for a binder than PVA. Besides, the aqueous modified organic polymer solutions are miscible with ethanol but PVA is not, so the modified organic polymers are considered better to wet the separator substrate than PVA, thereby forming a thinner heat-resistant coating layer is expected and proved in Examples 15 and 16. In addition, Examples 13 to 15 show that the composite separators prepared by using a composite binder obtained by mixing an organic-inorganic composite sol and an modified organic polymer binder with improved wetting with the substrate exhibits an air permeability of about 200 sec/100 ml and thermal shrinkage of 1 to 2% at 130° C. for 30 min.

separator of the present invention will greatly contribute to the development of the lithium secondary battery industry. Although this process is water-based and a simple coating process, but provides substantially improved battery performance. Thus, it is considered to have industrial competitiveness.

The invention claimed is:

1. A composite separator for a lithium secondary battery comprising of;
  (a) a porous polymer substrate,
  (b) a heat-resistant coating layer of an inorganic material formed on the surface of the substrate,
  (c) a binder for adhering the porous polymer substrate and the heat-resistant coating layer; and
  (d) a surfactant,

TABLE 2

| | COMPOSITION(wt %) | | | | | |
|---|---|---|---|---|---|---|
| | BOEHMITE CONCENTRATION IN SLURRY (wt %) | BOEHMITE | ORGANIC-INORGANIC COMPOSITE SOL | ORGANIC POLYMER | SURFACTANT | AIR PERMEABILITY (SEC/100 ML) | SHRINKAGE (%, TD/MD) 130° C./ 30 min |
| EXAMPLE 1 | 17.9 | 100 | 5.03 | 1.96 (PVA) | 0 | 170.7 | 3.66/5.42 |
| EXAMPLE 2 | | | | | 0.30 | 185.9 | 1.44/0.78 |
| EXAMPLE 10 | 20.0 | 100 | 3.73 | 2.03 (PVA) | 1.04 | 203.1 | 0.0/0.0 |
| EXAMPLE 11 | | | | | | 182.3 | 0.52/0.38 |
| EXAMPLE 12 | 16.7 | 100 | 5.09 | 1.86 (PM) | 0 | 187.0 | 6.80/8.28 |
| EXAMPLE 13 | | | | | 1.86 | 183.8 | 3.94/4.82 |
| EXAMPLE 14 | 17.9 | 100 | 4.86 | 2.20 (PMs) | 1.58 | 193.7 | 2.50/1.78 |
| EXAMPLE 15 | 20 | 100 | 3.33 | 2.83 (PMa) | 1.02 | 198.2 | 1.16/0.38 |
| EXAMPLE 16 | 18.5 | 100 | 0 | 2.30 (PMs) | 1.04 | 192.3 | 0.82/1.02 |
| EXAMPLE 17 | 18.7 | 100 | 0 | 3.97 (PMs) | 1.40 | 202.0 | 1.42/0.62 |
| EXAMPLE 18 | 19.9 | 100 | 0 | 2.50 (PMs) | 1.42 | 188.0 | 2.14/1.76 |
| | A polyethylene film (9 um) | | | | | 150 | 10.8/22.0 |
| COMPARATIVE EXAMPLE 1 | 21.9 | 100 | 1.50 | 0 | 0 | 166.8 | 7.70/11.84 |
| | | | | | 0.31 | 167.0 | 8.36/16.10 |
| COMPARATIVE EXAMPLE 2 | 20.9 | 100 | 0 | 2.44 | 0 | 158.4 | 2.76/3.68 |
| | | | | | 0.33 | 176.8 | 1.10/1.12 |

Figure 6:
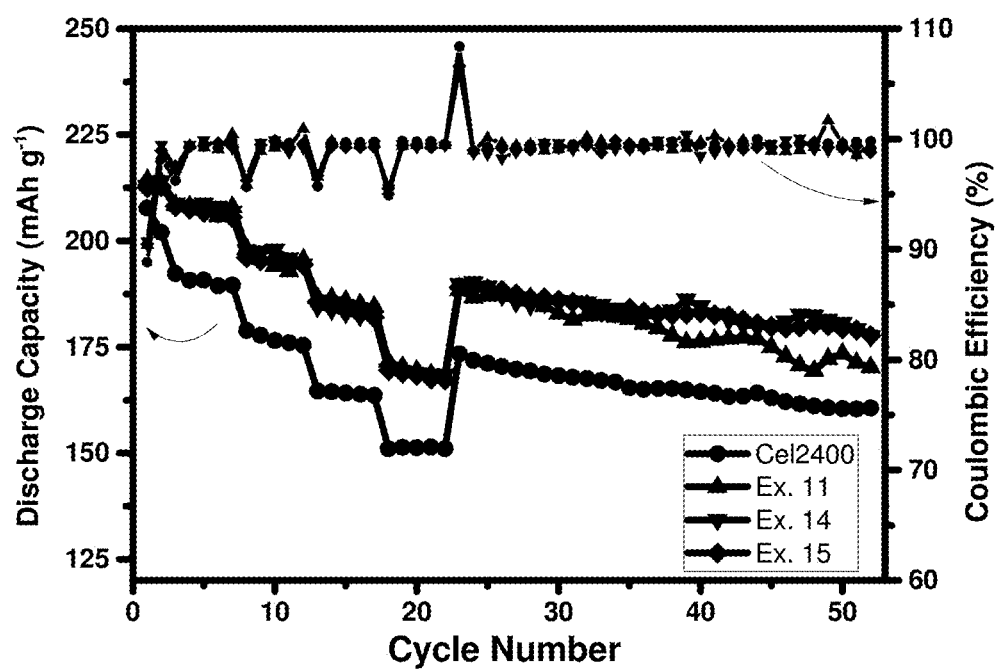
FIG. 6 is a graph comparing the discharge capacities vs cycle numbers for coin cells with separators from Examples 11, 14, and 15 of the present invention, and the Celgard 2400.
Figure 7:
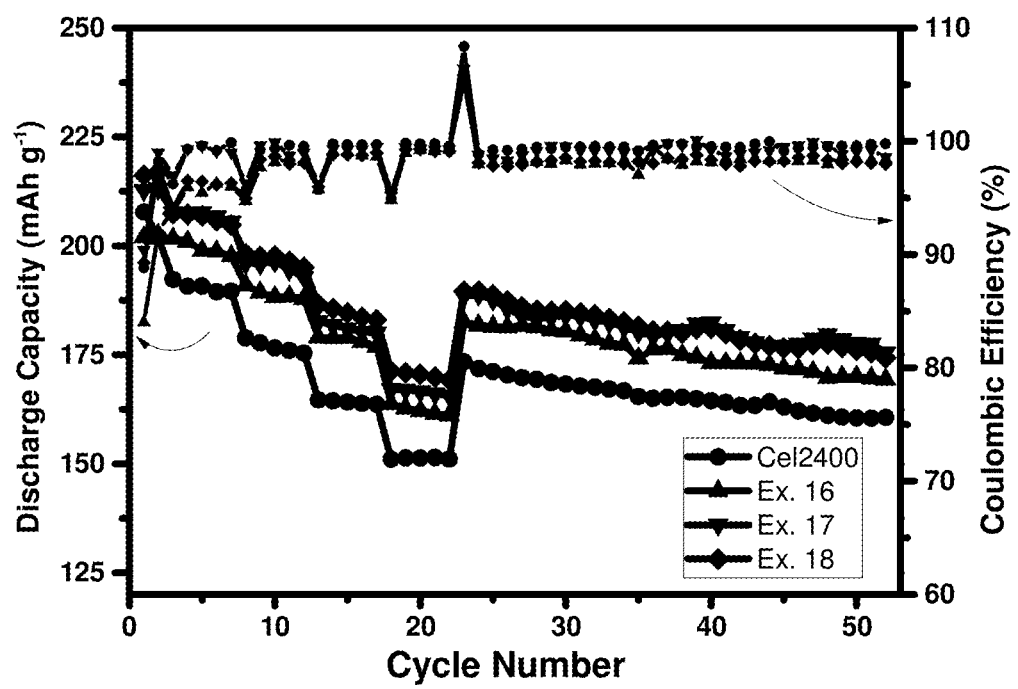
FIG. 7 is a graph comparing the discharge capacities vs cycle numbers for coin cells with separators from Examples 16, 17, and 18 of the present invention and the Celgard 2400.

Such prepared composite separators were subjected to cell tests and the results are shown with that of Celgard 2400 in FIG. 6. The discharge capacities with the composite separators of Examples 14 and 15 in the present invention were about 83% at 52 cycles, which is much better than 77.3% of the Celgard 2400 and the efficiencies were also excellent. Also, even in Examples 16 to 18 using only the modified organic polymer (PMs) as a binder, both the air permeability and the thermal shrinkage were excellent. Their cell test results are compared with the Celgard 2400 in FIG. 7, and it can be seen that both the discharge capacity and efficiency are substantially better than those of the Celgard 2400.

Therefore, it was found that the modified organic polymer binder can provide excellent wettability and adhesion to the substrate, and the performance of such a binder is promoted with the aid of a surfactant. In addition, it was found that the addition of a surfactant was also necessary in a composite binder using a mixture of an organic-inorganic composite sol and an organic polymer.

INDUSTRIAL APPLICABILITY

Lithium secondary batteries of high capacity and high performance should be highly heat resistant. Therefore, it is believed that the ceramic-coated heat-resistant composite wherein the binder is:
  i) a composite binder which is a mixture of an organic-inorganic composite sol and either a first organic polymer or a modified organic polymer; or
  ii) the modified organic polymer of (i), and
wherein the modified organic polymer comprises a hybrid sol obtained by reacting a second organic polymer with a carboxylic acid, and reinforced by further reaction with a nano-sized inorganic material, the carboxylic acid being one or more selected from the group consisting of maleic acid, oxalic acid, malic acid, succinic acid, and citric acid, and the nano-sized inorganic material being silica or boehmite.

2. The composite separator for a lithium secondary battery according to claim 1, wherein the binder is used in an amount of 1 to 10 parts by weight based on 100 parts by weight of the inorganic material.

3. The composite separator for a lithium secondary battery according to claim 1, wherein the first and second organic polymer are polyvinyl alcohol (PVA) or polyethylene glycol (PEG).

4. The composite separator for a lithium secondary battery according to claim 1, wherein the carboxylic acid with respect to 100 parts by weight of the second organic polymer is 5 to 30 parts, and the inorganic material for 100 parts by weight of the modified organic polymer is 1 to 20 parts.

5. The composite separator for a lithium secondary battery according to claim 1, wherein the first organic polymer or the modified organic polymer and the organic-inorganic composite sol are mixed in a weight ratio of 1:0.16 to 2.

6. The composite separator for a lithium secondary battery according to claim 1, wherein the surfactant comprises 0.1 to 5 parts by weight of a nonionic surfactant with respect to 100 parts by weight of the inorganic material.

7. The composite separator for a lithium secondary battery according to claim 6, wherein the nonionic surfactant contains at least one of fluorine-based or siloxane-based compounds.

8. The composite separator of claim 1, wherein the porous polymer substrate is one selected from the group consisting of polyethylene, polypropylene, polyethylene terephthalate, polybutylene terephthalate, polyester, polyacetal, polyamide, polycarbonate, polyimide, polyether ether ketone, polyether sulfone, polyphenylene oxide, polyphenylene sulfide, and polyethylene naphthalate.

9. The composite separator for a lithium secondary battery according to claim 1, wherein the inorganic material forming the heat-resistant coating layer is at least one selected from the group consisting of boehmite, barium titanate, alumina, silica, zirconia, and titanium oxide.

10. The composite separator for a lithium secondary battery according to claim 1, wherein the inorganic material is mixed in a weight ratio of 1:0 to 0.3 with large particles having an average particle size of 30 to 500 nm and small particles of 4 to 20 nm.

* * * * *